(12) United States Patent
Proksch et al.

(10) Patent No.: US 10,857,755 B2
(45) Date of Patent: Dec. 8, 2020

(54) EMBOSSED MATTE AND GLOSSY PLASTIC FILM AND METHODS OF MAKING SAME

(71) Applicant: Clopay Plastic Products Company, Inc., Mason, OH (US)

(72) Inventors: Tobias Proksch, Burgbernheim (DE); Frank Eschenbacher, Schnelldorf (DE)

(73) Assignee: Clopay Plastic Products Company, Inc., Mason, OH (US)

( * ) Notice: Subject to any disclaimer, the term of this patent is extended or adjusted under 35 U.S.C. 154(b) by 76 days.

(21) Appl. No.: 14/834,551

(22) Filed: Aug. 25, 2015

(65) Prior Publication Data

US 2016/0059512 A1    Mar. 3, 2016

Related U.S. Application Data

(60) Provisional application No. 62/043,998, filed on Aug. 29, 2014, provisional application No. 62/081,117, filed on Nov. 18, 2014.

(51) Int. Cl.
*B32B 3/30* (2006.01)
*B44F 1/02* (2006.01)
(Continued)

(52) U.S. Cl.
CPC .............. *B32B 3/30* (2013.01); *B29C 59/022* (2013.01); *B29C 59/04* (2013.01); *B32B 7/02* (2013.01); *B44C 1/24* (2013.01); *B44F 1/02* (2013.01); *B29C 2059/023* (2013.01); *B32B 2274/00* (2013.01); *B32B 2307/406* (2013.01); *B32B 2307/408* (2013.01); *B32B 2307/558* (2013.01); *B32B 2555/02* (2013.01)

(58) Field of Classification Search
CPC .............. B32B 7/02; B32B 2307/406; B32B 2307/558; B32B 2307/408; B32B 2274/00; B32B 2555/02; B44C 1/24; B29C 59/04; B29C 59/022; B29C 2059/023; B44F 1/02
See application file for complete search history.

(56) References Cited

U.S. PATENT DOCUMENTS 3,557,265 A    1/1971    Chisholm et al.
3,884,606 A    5/1975    Schrenk
(Continued)

FOREIGN PATENT DOCUMENTS

CA    2208087        6/1996
CN    1401692 A  *  3/2003
(Continued)

OTHER PUBLICATIONS

EPO Translation of CN 1401692 (Year: 2018).*
(Continued)

*Primary Examiner* — Michael Zhang
(74) *Attorney, Agent, or Firm* — Barnes & Thornburg LLP

(57) ABSTRACT

Thermoplastic polymeric films and methods of making thereof, comprising at least one thermoplastic polymer, wherein at least one portion of said film is micro-embossed with a micro-embossing pattern; at least one portion of the film is embossed with a first embossing pattern having a first embossing depth which may be greater than the micro-embossing depth; and, wherein the film has a basis weight of about 30 gsm or less and an impact strength of at least about 15 g.

14 Claims, 11 Drawing Sheets

(51) Int. Cl.
  *B44C 1/24* (2006.01)
  *B29C 59/02* (2006.01)
  *B29C 59/04* (2006.01)
  *B32B 7/02* (2019.01)

(56) References Cited

U.S. PATENT DOCUMENTS

| | | | |
|---|---|---|---|
| 3,950,480 A * | 4/1976 | Adams | B29C 59/04 |
| | | | 264/284 |
| 4,376,147 A * | 3/1983 | Byrne | A61F 13/51476 |
| | | | 428/156 |
| 4,546,029 A | 10/1985 | Cancio et al. | |
| 5,202,074 A | 4/1993 | Schrenk et al. | |
| 5,229,186 A * | 7/1993 | Tribble | B29C 59/022 |
| | | | 428/156 |
| 5,385,769 A * | 1/1995 | Wick | B29C 43/222 |
| | | | 428/141 |
| 5,962,545 A | 10/1999 | Chaudhary et al. | |
| 6,120,636 A * | 9/2000 | Nilsen | B29C 41/26 |
| | | | 156/230 |
| 6,576,809 B1 * | 6/2003 | Inoue | A61F 13/42 |
| | | | 604/361 |
| 7,879,452 B2 | 2/2011 | Muslet | |
| 2001/0041487 A1 * | 11/2001 | Brady | A61F 13/51462 |
| | | | 442/286 |
| 2003/0047271 A1 * | 3/2003 | Wu | A61F 13/51462 |
| | | | 156/229 |
| 2004/0151796 A1 | 8/2004 | Boegli | |
| 2005/0280182 A1 | 12/2005 | Boegli | |
| 2007/0042160 A1 | 2/2007 | Nakajima | |
| 2007/0100308 A1 | 5/2007 | Miyairi | |
| 2008/0306463 A1 * | 12/2008 | Dent | A61F 13/15 |
| | | | 604/372 |
| 2009/0117330 A1 | 5/2009 | Shiina et al. | |
| 2012/0279181 A1 | 11/2012 | Gkinosatis | |
| 2015/0166844 A1 * | 6/2015 | Clarke | B29C 47/0021 |
| | | | 428/43 |

FOREIGN PATENT DOCUMENTS

| | | |
|---|---|---|
| CN | 1401692 A | 3/2003 |
| CN | 101378900 A | 3/2009 |
| DE | 10100692 A1 | 11/2002 |
| DE | 10100692 A1 | 11/2002 |
| DE | 10100692 B4 | 11/2002 |
| EP | 1693034 A1 | 8/2006 |
| JP | 5162192 | 6/1993 |
| JP | 6509132 | 10/1994 |
| JP | 10193454 | 7/1998 |
| JP | 2005160710 | 6/2005 |
| JP | 2006183216 | 7/2006 |
| JP | 5277635 | 8/2013 |
| JP | 5508090 | 5/2014 |
| WO | 1991003367 A | 3/1991 |
| WO | 1992000050 A1 | 1/1992 |
| WO | 1993001047 A | 1/1993 |
| WO | 1993001047 A1 | 1/1993 |
| WO | 1999029766 A | 6/1999 |
| WO | 2001036213 | 5/2001 |
| WO | 2001051546 | 7/2001 |
| WO | 2002027089 | 4/2002 |
| WO | 2007091593 A1 | 8/2007 |
| WO | 2009014901 A2 | 1/2009 |
| WO | 2009094506 | 7/2009 |
| WO | 2013130211 | 9/2013 |

OTHER PUBLICATIONS

International Search Report and Written Opinion from corresponding PCT case PCT/US2015/046885, dated Mar. 15, 2016, 19 pages.
Dooley, J. et al. "Co-Extrusion", Encyclopedia of Polymer Science and Technology, John Wiley & Sons, Inc., New York (2001).
Columbia Office Action for Columbian Pat. App. No. NC2017/0002066 received on Jun. 1, 2018, CLP-14018 CO ||, 24 pages.
Chinese Office Action and Search Report for Chinese App. No. 2015800473205 dated Jul. 3, 2018, CLP-14018 CN ||, brief English translation provided, 10 pages.
English Translation of Chinese Office Action and Search Report for Chinese App. No. 2015800473205 dated Jul. 3, 2018, CLP-14018 CN ||, 9 pages.
Chilean Search Report for Chilean App. No. 413-2017 received Jun. 29, 2018, CLP-14018 CL ||, 15 pages.
Chilean Search Report for Chilean App. No. 413-2017 received Jan. 23, 2019, CLP-14018 CL ||, 6 pages.
Columbia Office Action for Columbian Pat. App. No. NC2017/0002066 received on Nov. 1, 2018, CLP-14018 CO ||, 34 pages.
Australian First Examination Report for Australian App. No. 2015306645 dated Dec. 5, 2018, CLP-14018 AU ||, 15 pages.
Columbia Office Action for Columbian Pat. App. No. NC2017/0002066 received on May 29, 2019, CLP-14018 CO ||, 27 pages.
Chinese Office Action for Chinese App. No. 201580047320.5 dated Mar. 4, 2019, CLP-14018 CN ||, brief English translation provided, 8 pages.
Egyptian Office Action for Egyptian Patent App. No. 204/2017 received on Apr. 25, 2020, CLP14018 EG ||9 pages.
Japanese Office Action for Japanese App. No. 2017-5111740 dated Apr. 27, 2020, CLP-14018 JP ||, 13 pages.
Brazilian Search Report for Brazilian Patent App. BR112017003093-4 established Apr. 8, 2020, CLP-14018 BR ||, 9 pages.
Chinese Office Action for Chinese App. No. 201580047320.5 dated Aug. 2, 2019, CLP-14018 CN ||, brief English translation provided, 13 pages.
Egyptian Office Action for Egyptian Patent App. No. 204/2017 received on Aug. 5, 2019, CLP14018 EG || 11 pages.
Japanese Office Action for Japanese App. No. 2017-5111740 dated Aug. 9, 2019, CLP-14018 JP ||, 10 pages.
Columbia Office Action for Columbian Pat. App. No. NC2017/0002066 received on Sep. 1, 2020, 17 pages.

* cited by examiner

EMBOSSED MATTE AND GLOSSY PLASTIC FILM AND METHODS OF MAKING SAME

RELATED APPLICATIONS

This application claims the benefit of priority of U.S. Provisional Patent Application No. 62/043,998, filed Aug. 29, 2014, and of U.S. Provisional Patent Application No. 62/081,117, filed Nov. 18, 2014, both of which are incorporated herein in their entirety.

FIELD OF THE INVENTION

The present invention relates to embossed thin thermoplastic films comprising matte and glossy finishes, and methods of making said films.

BACKGROUND OF THE INVENTION

Thermoplastic films are widely used in personal care items, for example, as the outer layer of a diaper or other disposable personal hygiene product. For a variety of reasons, including cost, comfort, conservation of resources and minimizing waste, it is desirable to have as thin a film as possible. It is further desirable to produce films that have a soft, cloth-like feel (i.e., good haptic qualities), and that are quiet when the film is subjected to movement or friction. Producing thermoplastic films that meet manufacturer's needs and expectations is as much an art as a science. The thinner the film, the greater is the challenge of maintaining the film's integrity and processability.

When a film is intended for use in a consumer product, for example a diaper, it is further desirable to provide aesthetically pleasing films. This may be accomplished by printing designs onto a film, by providing contrast in the form of a matte or a glossy finish, or by etching, engraving or embossing the film. Diapers and personal hygiene products comprising printed films are well-known in the art. However, the printed designs tend to have a dull finish, and relatively poor resolution of the images. Embossed plastic films having a matte finish also are known, as are films having a glossy finish. To date, however, both matte and glossy finishes typically have not been incorporated into a single design.

The inventors of the present invention found that when a film comprises a design that incorporates a matte and/or a glossy finish, the design has a surprisingly striking "3-D" appearance that is highly desirable in consumer products. However, it proved challenging to incorporate such a design into a thin film with physical properties suitable for a personal hygiene product. For example, to obtain a matte finish, a film may be embossed with very fine lines that, when viewed with the unaided eye, appear as a matte finish. This changes the integrity of the film, and affects further processing.

To achieve a glossy finish, the film may be either printed with a glossy ink, or a polymeric material may be selected which has a glossy finish. To achieve a 3D-effect, it is further necessary to emboss the film with at least two patterns. With a relatively thick film, more material is available to accommodate the embossing. As the thickness is reduced, however, embossing is more likely to result in a film that tears easily, or that has pinholes or defects in the film, which in turn leads to unacceptable leakage in the final product. After production, the thermoplastic films may be wound and stored until they are incorporated into a final product. A very thin film may fail to completely retain the embossed pattern during winding and storage, and some definition of the design may be lost. Finally, embossing may affect the haptic qualities of a film. Therefore, an additional challenge is to ensure that the film has a soft and cloth-like feel, in addition to being aesthetically pleasing, having good strength, and being free of holes.

SUMMARY OF THE INVENTION

The present invention meets the aforementioned needs and improves upon the existing state of the art by providing novel thin thermoplastic films that comprise areas having a matte finish and a glossy finish, and methods of making thereof. The matte finish may be produced by micro-embossing, which also may result in good haptic qualities. Embossing, also referred to as "macro-embossing," utilizes a wider line-width than micro-embossing and may add one or more additional depths of embossing. Embossed areas may be either matte or glossy, which contribute to a 3-D appearance of the design. All of the aforementioned are accomplished while maintaining physical qualities which are necessary for the film to be used successfully in consumer products, such as personal hygiene products.

The films may have a basis weight of about 30 gsm or less, and good tear strength and tensile strength. In addition, the films may comprise printed designs, which further may be in register with the embossed design.

The following represent some non-limiting embodiments of the present invention.

According to one embodiment, a thermoplastic polymeric film is provided comprising at least one thermoplastic polymer, wherein at least one portion of said film is micro-embossed; at least one portion of the film is embossed with a first embossing pattern having a first embossing depth which is greater than the micro-embossing depth; and, wherein the film has a basis weight of about 30 gsm or less and an impact strength of at least about 15 g.

According to another embodiment of the present invention, a thermoplastic polymeric film is provided comprising at least one thermoplastic polymer, wherein at least one portion of said film is micro-embossed with a micro-embossing pattern having a micro-embossing depth and a line density of at least about 125 lines/inch; at least one portion of the film is embossed with a first embossing pattern having a first embossing depth which is greater than the micro-embossing depth; and, at least one portion of the film is embossed with a second embossing pattern having a second embossing depth which is greater than the first embossing depth; the micro-embossed portion of the film has a ratio of $G_f/G_i$ of less than about 0.7 or a specular gloss of less than about 35 gloss units; the portion of the film embossed with the second embossing pattern has a ratio of $G_f/G_i$ that is greater than about 0.7 or a specular gloss of greater than about 35 gloss units; and, the film has a basis weight of about 30 gsm or less and an impact strength of at least about 15 g.

According to yet another embodiment of the present invention, a thermoplastic polymeric film is provided comprising at least one portion having a matte finish and a first specular gloss, and at least one portion having a glossy finish and a second specular gloss, wherein the difference between the first and the second specular gloss, $\Delta G$, is at least about 5 gloss units; and wherein the film has a basis weight of about 30 gsm or less and an impact strength of at least about 15 g.

According to yet another embodiment of the present invention, a thermoplastic polymeric film is provided comprising at least one thermoplastic polymer, wherein at least one portion of said film is micro-embossed with a micro-embossing pattern having a line density of at least about 125 lines/inch; at least one portion of the film is embossed with a first embossing pattern; at least one portion of the film is embossed with a second embossing pattern; and the film has a basis weight of about 30 gsm or less and an impact strength of at least about 15 g; and further wherein the micro-embossed portion of the film has a ratio of $G_f/G_i$ of less than about 0.7 and the portion of the film embossed with the second embossing pattern has a ratio of $G_f/G_i$ that is greater than about 0.7, and/or wherein the difference in specular gloss between the micro-embossed portion of the film and the portion of the film embossed with the second embossing pattern is at least 10 gloss units.

According to another embodiment, a method of making an embossed thermoplastic polymeric film is provided, comprising the steps of advancing a thermoplastic polymeric film having a basis weight of about 30 gsm or less between a first embossing roll and a second embossing roll, wherein the first embossing roll comprises a micro-embossing pattern suitable to impart a matte finish onto the film, and the second embossing roll comprises at least one embossing pattern suitable to impart at least one embossed design onto the film; and applying sufficient pressure to force the film into the micro-embossing pattern and the embossing pattern.

According to another embodiment of the present invention, a method of making an embossed thermoplastic polymeric film is provided, comprising the steps of advancing a thermoplastic polymeric film having a basis weight of about 30 gsm or less between a first embossing roll and a non-embossing counter roll, wherein the first embossing roll comprises at least one micro-embossing pattern suitable to impart a matte finish onto the film; and at least one embossing pattern suitable to impart at least one embossed design onto the film; and applying sufficient pressure to force the film into the micro-embossing pattern and the first embossing pattern.

According to another embodiment, a method according to one of the previous embodiments is provided, wherein the thermoplastic polymeric film comprises a polyolefinic polymer, a polyolefinic copolymer, an olefinic block copolymer, or combinations thereof.

According to another embodiment, a method according to one of the previous embodiments is provided wherein the thermoplastic polymeric film is cast, blown, calendered, mono-extruded, co-extruded, chill cast, or combinations thereof.

According to another embodiment, a method according to one of the previous embodiments is provided, further comprising the step of printing a design on the thermoplastic polymer film prior to embossing.

According to another embodiment, a method according to one of the previous embodiments is provided, further comprising registering the embossing pattern with the printed design.

According to another embodiment, a method according to one of the previous embodiments is provided, wherein the temperature of the embossing roll and/or non-embossing roll is from about 45° C. to about 150° C.

According to another embodiment, a method according to one of the previous embodiments is provided, wherein the temperature of the embossing roll and/or the non-embossing roll is from about 10° C. to about 50° C.

According to another embodiment, a method according to one of the previous embodiments is provided, wherein the matte finish has a ratio of $G_f/G_i$ of less than about 0.7 or a specular gloss of less than about 35 gloss units.

According to another embodiment, a method according to one of the previous embodiments is provided, wherein the glossy finish has a ratio of $G_f/G_i$ that is greater than about 0.7 or a specular gloss of greater than about 35 gloss units.

According to another embodiment, a method according to one of the previous embodiments is provided, wherein the matte finish comprises a micro-embossing pattern comprised of embossing lines having a density of less than about 75 lines/inch.

According to another embodiment, a method according to one of the previous embodiments is provided, wherein the matte finish comprises a micro-embossing pattern comprised of embossing lines having a density of greater than about 75 lines/inch.

According to another embodiment, a method according to one of the previous embodiments is provided, wherein the embossing roll and/or non-embossing roll comprise an embossed or engraved sleeve.

DETAILED DESCRIPTION OF THE INVENTION

Definitions

Figure 1:
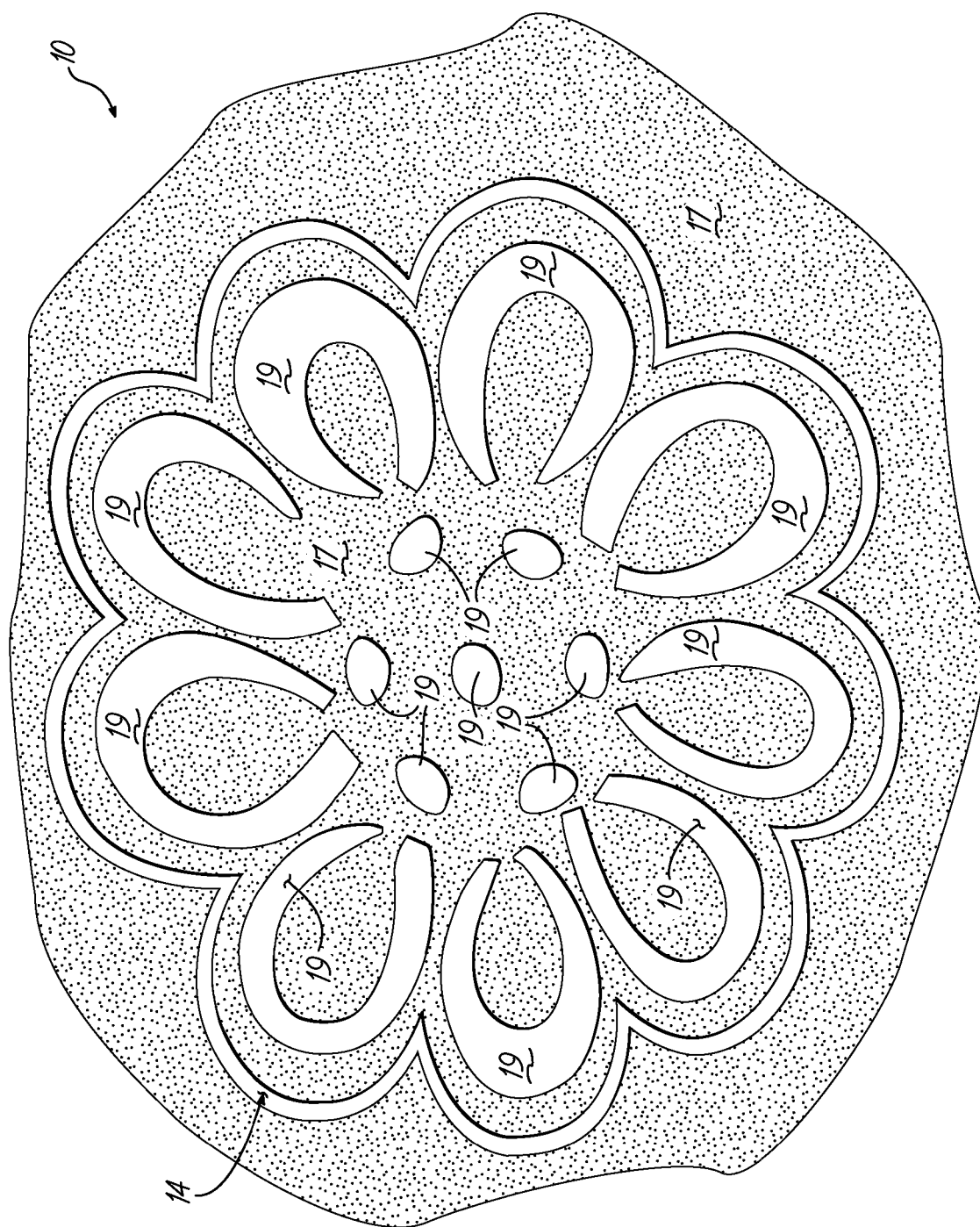
FIG. 1 depicts a drawing of one design that has been incorporated into a thermoplastic film of the present invention. The film comprises on one side an embossed pattern comprising areas of matte finish and glossy finish.

As used herein:

"Elongation," as used herein, means the length that a film is able to be stretched prior to breaking, typically expressed as a percentage relative to the original length. For example, a film that can be stretched to twice its original length without breaking has an elongation of 200%. Elongation further may be the result of being stretched in the machine-direction (MD), understood to mean the direction the film travels through the production line (i.e., lengthwise) or in the cross-direction (CD), understood to mean perpendicular to the MD (i.e., in the width of the film).

"Gloss," or "specular gloss," is a measure of the reflective qualities of the thermoplastic film surface and is made in accordance with ASTM D 2457-03. A general procedure for measuring specular gloss of a film sample includes placing a 2 cm×2 cm sample on a black sheet of paper, and obtaining the gloss measurement using a BYK Micro Gloss 45° device (BYK-Gardner GmbH; Geretsried, Germany). Gloss is measured in Gloss Units (GU).

"$G_i$" means "initial gloss," or the gloss of a film prior to micro-embossing or embossing.

"$G_f$" means "final gloss," or the gloss of a film after micro-embossing, embossing, or otherwise modifying the film surface. The ratio of $G_f/G_i$ is a means of normalizing gloss measurements, and is a ratio of $G_f$ to $G_i$ as performed on the same or a substantially similar film prior to and after modification of the film surface.

"Delta gloss," "Δ Gloss," or "difference in gloss," or other similar terms, mean a difference in specular gloss unit measurements, typically taken on different portions of the same film.

"Gsm" means grams per square meter, and is a measure of the basis weight of a film, which is an industry standard term that quantifies the thickness or unit mass of a film or laminate product.

"In register" means that a pattern, such as a printed pattern, is spatially synchronized with a design that is embossed, etched, engraved, etc. into a film, such that the printed pattern and design are repeated in a regular and unified manner.

"Micro-embossed" means an embossing pattern comprising finely embossed lines or patterns that create a dull appearance relative to the non-embossed film. The lines or patterns may be indistinguishable or barely distinguishable to the unaided eye, yet when viewed from a distance, e.g., arms-length, appear as an even matte finish.

"Embossed" means a film in which a portion of the surface stands out in relief from the surrounding film surface. The terms "embossed" and "macro-embossed" may be used herein interchangeably to distinguish from micro-embossing. The films of the present invention may comprise designs or patterns that in turn comprise a plurality of embossing depths, widths and spacing between adjacent design elements.

"Impact strength," means the mass of a projectile required to puncture a film, as measured according ASTM D1709 entitled "Standard Test Method for Impact Resistance of Plastic Film by the Free-Falling Dart Method," Test Method A, and is expressed in units of grams.

"Non-embossed" means a film or a portion of a film which has not been subjected to embossing or micro-embossing.

"Matte" means a dull finish, which for the purposes of the present invention may be quantitatively characterized based on a reduction in specular gloss caused by a micro-embossing pattern. Herein, a matte finish refers to a thermoplastic film surface wherein $G_f$ is equal to or less than 0.7 $G_i$, or in other words, exhibits at least 30% less gloss than the film prior to micro-embossing or to a comparative, substantially similar, non-embossed film.

"Tensile strength," means the load required to induce a break ("load at break") in the film in either the CD or the MD. Tensile strength is expressed in units of N/cm or equivalent units thereof, and is determined by ASTM method D822-02.

Embossing

The thin thermoplastic films of the present invention comprise one or more portions having a matte finish. A matte finish typically represents the background of an overall design, and may be produced by a number of means, including "sand-blasting," micro-embossing, and/or other means that would be known to one of skill in the art. Micro-embossing may be accomplished by fine lines, shapes or patterns that may be invisible to the unaided eye. Non-limiting examples of a matte finish include substantially random lines ("leather look"), patterned shapes, or patterned lines, as exemplified by films sold under the tradename MICROFLEX, made by Clopay Plastic Products Corp., Mason Ohio.

In contrast to micro-embossing, embossing utilizes line widths and designs that are visible to the unaided eye and may utilize an embossing depth greater than the depth of the micro-embossing. The embossed portions of the film are generally visually distinct to the unaided eye, and may have a smoother surface relative to the micro-embossed portions. The embossed portions of the film may have either a matte or a glossy appearance. In one embodiment, additional embossing patterns have successively greater embossing depths. Thus, for example, a film may have a micro-embossed design having a micro-embossing depth as a background pattern; a first embossed design, such as raindrops, at a first embossing depth, and a second embossed design, such as flowers, logos, trademarks or other whimsical designs, at a second embossing depth. The second embossing depth may be greater than the first embossing depth, and the second embossed design may be larger in area than the first embossed design. By incorporating varying depths and sizes of embossed patterns, a film is produced that has a striking appearance and is very visually appealing. FIG. 1 depicts a drawing of one non-limiting example of a single film (10) comprising a micro-embossed matte background (17), and a first embossed portion which may be at a depth greater than that of the micro-embossed design, and which depicts a first embossed raindrop design (19). FIG. 1 further includes a second embossed design (14) which is larger in area than the first embossed design, and which may have a greater embossing depth than the first embossed design. It would be within the knowledge of one of skill in the art to add a number of additional levels of embossing that may further increase the visual appeal of the design.

A matte finish may be qualitatively characterized as a non-glossy, or "dull," appearance on a plastic film. Quantitatively, a matte finish may be characterized by having a $G_f$ that is equal to or less than 0.7 $G_i$. In other words, the matte portion of a film has a 30% or more reduction in specular gloss when compared to a non-embossed portion of the same film or to a substantially similar, non-embossed film. In the present invention, a matte portion of a film has a $G_f/G_i$ of less than about 0.7, alternatively from about 0.1 to about 0.7, and alternatively from about 0.25 to about 0.55. To quantify in absolute as opposed to relative terms, the matte portion of said design may have a specular gloss of less than about 35 gloss units, alternatively from about 10 to about 35 gloss units, alternatively from about 20 to about 35 gloss units, and alternatively from about 30 to about 35 gloss units.

In one embodiment, the matte portion of the film is micro-embossed. In one embodiment the micro-embossed portion of the film comprises lines, shapes, or combinations thereof. The lines may be in a substantially random pattern or a regular pattern, which is understood to include substantially straight and/or parallel lines, non-limiting examples of which are described in U.S. Pat. Nos. 4,376,147 and 4,546,029. In one embodiment, the lines, shapes or combinations thereof are indistinguishable by an unaided human eye, and when viewed from a normal reading distance appear as a uniform matte finish. In one embodiment, the lines have a density of less than about 75 lines/inch. In alternative embodiments, the lines have a density of at least about 75 lines/inch, alternatively of at least about 100 lines/inch, alternatively of at least 125 lines/inch, alternatively of at least about 150 lines/inch, and alternatively at least about 250 lines/inch. In one non-limiting example, the matte portion of the film comprises micro-embossed lines in a regular pattern and having a density of at least about 250 lines/inch. In yet another embodiment, the matte portion of the film comprises micro-embossed shapes having a density of at least about 150 lines/inch.

The micro-embossed lines, shapes or combinations thereof may have a micro-embossing depth of less than about 80 µm, alternatively of less than about 70 µm, alternatively of less than about 50 µm, alternatively of from about 1 µm to about 80 µm alternatively of from about 15 µm to about 80 µm, alternatively of from about 25 µm to about 50 µm, and alternatively of from about 35 µm to about 40 µm. When referring to micro-embossing, the term "micro-embossing depth" means the distance between the uppermost surface of the film and the lowest portion of the micro-embossed line or pattern, when viewed from the side (thin edge) of the film.

In one embodiment, at least about 25% of the total surface area of the film is micro-embossed. Alternatively, the percentage of the total surface area of the micro-embossed portion of the film may be at least about 30%, at least about 40%, at least about 50%, and alternatively at least about 75%.

The films of the present invention further comprise at least one embossed portion, which may comprise a first embossed design. The embossed portion(s) or area(s) of the film may have an embossing depth greater than that of the micro-embossed portion, or may be of substantially the same depth. When referring to embossing, the term "embossing depth" means the distance between the uppermost surface of the film and the lowest portion of the embossed line or pattern, when viewed from the side (thin edge) of the film. In one embodiment, the embossed design has an embossing depth of from about 1 µm to about 125 µm, alternatively of from about 80 µm to about 125 µm alternatively of from about 80 µm to about 125 µm, alternatively from about 90 µm to about 125 µm, and alternatively from about 100 µm to about 125 µm.

The films of the present invention may comprise one or more additional embossed portions. In one embodiment, the film comprises a second embossed portion comprising a second embossed design. The second embossed design may have an embossing depth which is substantially similar to that of a micro-embossed portion or a first embossed portion. Alternatively, the second embossed design may have an embossing depth from about 1 µm to about 130 µm, of at least about 130 µm, alternatively of at least about 140 µm, alternatively of at least about 150 µm, and alternatively from about 130 µm to about 170 µm. It is believed that increasing the number of levels of embossing may serve to increase the visual appeal of the film. It would be apparent to one of skill in the art, however, that the number of embossing levels and the depth of embossing ultimately is limited by the thickness of the film and other physical film properties.

The embossed designs may have a matte finish and/or a glossy finish. When the embossed portions of the film have a matte finish, the specular gloss is less than about 35 gloss units, alternatively from about 10 to about 35 gloss units, alternatively from about 20 to about 35 gloss units, and alternatively from about 10 to about 25 gloss units. When the embossed portions of the film have a matte finish, the ratio of $G_f/Gi$ of less than 0.7, alternatively is from about 0.2 to about 0.7, and alternatively is from about 0.3 to about 0.6.

In one embodiment, the embossed portions of the film have a glossy finish. When the embossed portions of the film have a glossy finish, the ratio of $G_f/Gi$ is greater than about 0.7, alternatively greater than about 0.8, and alternatively greater than about 0.9. To quantify in absolute as opposed to relative terms, the embossed portion of a design may have a specular gloss of at least about 35 gloss units, alternatively of from about 35 to about 45 gloss units, and alternatively of from about 35 to about 40 gloss units.

Yet another means of characterizing the matte and glossy portions of the films is in terms of the difference in gloss between a relatively matte portion and a glossy portion. Thus, in one alternative embodiment, the films comprise a portion having a matte finish and a portion having a glossy finish, wherein the difference in specular gloss between the matte and the glossy portions, $\Delta G$, is at least about 5 gloss units, alternatively at least about 10 gloss units, alternatively at least about 15 gloss units, alternatively at least about 20 gloss units, and alternatively at least about 25 gloss units.

The glossy portions of a film further may comprise non-embossed portions of a film that has a glossy appearance due to the composition of the film, or due to a glossy finish such as a paint or lacquer. Alternatively or additionally, the glossy portions may result from embossing a portion of a film that previously was micro-embossed. This may result in a localized reduction, or substantial elimination, of the micro-embossing.

In the present invention, a non-embossed glossy portion of a film may have a $G_f/Gi$ of greater than about 0.7, alternatively of greater than about 0.8, alternatively of greater than about 0.9. To quantify in absolute as opposed to relative terms, the micro-embossed portion of said design may have a specular gloss of at least about 35 gloss units, alternatively of from about 35 to about 45 gloss units, and alternatively of from about 35 to about 40 gloss units.

Film

The embossed thermoplastic films of the present invention may be made from any of a number of suitable thermoplastic materials, and comprise one or more thermoplastic polymers. Suitable polymers for the films include, but are not limited to, polyolefins, for example, polyethylene homopolymers and copolymers, polypropylene, polypropylene homopolymers and copolymers, functionalized polyolefins, polyesters, poly(ester-ethers), polyamides, including nylons, poly(ether-amide), polyether sulfones, fluoropolymers, polyurethanes, and mixtures thereof. Polyethylene homopolymers include those of low, medium or high density and/or those formed by high pressure or low pressure polymerization. Polyethylene and polypropylene copolymers include, but are not limited to, copolymers with C4-C8 alpha-olefin monomers, including 1-octene, 1-butene, 1-hexene and 4-methyl pentene. The polyethylene may be substantially linear or branched, and may be formed by various processes known in the art using catalysts such as Ziegler-Natta catalysts, metallocene or single-site catalysts or others widely known in the art. Examples of suitable copolymers include, but are not limited to, copolymers such as poly(ethylene-butene), poly(ethylene-hexene), poly(ethylene-octene), and poly(ethylene-propylene), poly(ethylene-vinylacetate), poly(ethylene-methylacrylate), poly(ethylene-acrylic acid), poly(ethylene-butylacrylate), poly(ethylene-propylenediene), poly(methyl methacrylate) and/or polyolefin terpolymers thereof. In one embodiment, the films comprise polyethylene, polypropylene, and combinations thereof. One example of a suitable commercially available polyethylene-based resin is Exceed™ 3527PA made by ExxonMobil Chemical Co. of Houston, Tex. One example of a suitable commercially available polypropylene copolymer is Borealis BD712CF made by Borealis, Vienna, Austria.

Other non-limiting examples of suitable olefinic polymeric compositions include olefinic block copolymers, olefinic random copolymers, polyurethanes, rubbers, vinyl arylenes and conjugated dienes, polyesters, polyamides, polyethers, polyisoprenes, polyneoprenes, copolymers of any of the above, and mixtures thereof. In addition, the films of the present invention, or layers thereof, may comprise brittle polymers, nonlimiting examples of which are disclosed in U.S. Pat. No. 7,879,452. In one embodiment, the films comprise an olefinic block copolymer.

In one embodiment, the olefinic block copolymer is polypropylene-based. Non-limiting examples of suitable polypropylene-based olefinic block copolymers are sold under the trade name INFUSE by The Dow Chemical Company of Midland, Mich., the trade names VISTAMAXX and EXXON IMPACT Copolymers such as Exxon PD 7623 by ExxonMobil Chemical Company of Houston, Tex. Polypropylene and polyesters both are known to increase the melting temperature of a formed polymeric film, improving the film's burn through resistance. In an alternative embodiment, the films of the present invention may comprise an ethylene-based olefinic block copolymer.

The aforementioned thermoplastic polymers may be present in the film or in individual layers of the film in an amount of from 0% to about 95%, alternatively from about 0% to about 40%, alternatively from about 10% to about 50%, alternatively from about 35% to about 50%, alternatively from about 20% to about 40%, and alternatively from about 1% to about 10%.

In one embodiment, the film, or one or more layers of a multilayer film, comprises from about 0.1% to about 90%, alternatively from about 1% to about 50%, alternatively from about 50% to about 85%, of an ethylene polymer, copolymer, an ethylene-based polymeric composition, or combinations thereof. In one embodiment, the ethylene polymer is a low-density ethylene polymer. Additionally or alternatively, the composition may comprise from about 0.1% to about 40%, an alternatively from about 1% to about 25% of polypropylene, a polypropylene-based polymeric composition, polypropylene copolymer, or combinations thereof.

The films of the present invention, or individual layers thereof, may comprise one or more elastomeric polymers, including styrenic block copolymers, elastomeric olefinic block copolymers and combinations thereof. Non-limiting examples of suitable styrenic block copolymers (SBC's) include styrene-butadiene-styrene (SBS), styrene-isoprene-styrene (SIS), styrene-ethylene-butylene-styrene (SEBS), styrene-ethylene-propylene (SEP), styrene-ethylene-propylene-styrene (SEPS), or styrene-ethylene-ethylene-propylene-styrene (SEEPS) block copolymer elastomers, polystyrene, and mixtures thereof. In one embodiment, the film comprises styrene-butadiene-styrene, polystyrene, and mixtures thereof. Suitable SBC resins are readily available from: KRATON® Polymers of Houston, Tex.; Dexco™ Polymers LP of Planquemine, La.; or Septon™ Company of America of Pasadena, Tex.

The films of the present invention may include optional components, such as fillers, plasticizers, compatibilizers, draw down polymers, processing aids, anti-blocking agents, viscosity-reducing polymers, and the like. Other additives may include antioxidants, antistatic agents, slip agents, foaming agents, heat or light stabilizers, UV stabilizers, and the like. Examples of suitable processing aids and stabilizers include POLYBATCH AMF 705 and POLYBATCH AO 25 S. Others would be readily known by one of skill in the art. In one embodiment, the polymeric compositions may comprise from about 0% to about 15%, and alternatively from about 0.1% to about 10%, and alternatively from about 0.2% to about 5%, of a suitable processing aid and/or stabilizer.

The films of the present invention may comprise one or more colorants, such as pigments and/or dyes. The colorant may be dispersed throughout the film, or printed onto one or both surfaces of the film. In one embodiment, the colorant is a glossy and/or metallic ink. Additionally or alternatively, the colorant may be printed in the form of a pattern on one or both surfaces of the film, and in one embodiment is in-register with the embossed design(s).

The films of the present invention may be made by a variety of processes that would be understood by one of skill in the art, and may be cast, blown, calendered, mono-extruded, co-extruded, chill cast, nip embossed, or any other method which would result in a film compatible with the process described herein.

The films of the present invention are thermoplastic monolayer or multilayer films and may have a basis weight of less than about 30 gsm, alternatively less than about 20 gsm, alternatively less than about 15 gsm, and alternatively less than about 10 gsm. In embodiment, the films of the present invention have a basis weight of from about 3 to about 30 gsm, alternatively of from about 5 to about 15 gsm, and alternatively of from about 8 to about 12 gsm. In one embodiment, for example, when a film is used as an outer packaging material or other application requiring a thicker film, the basis weight of the film may be greater than about 30 gsm, alternatively greater than about 40 gsm, alternatively greater than about 50 gsm, alternatively greater than about 60 gsm, and alternatively from about 30 gsm to about 100 gsm.

Multilayer films of the present invention may comprise at least 2 layers, alternatively at least 3 layers, alternatively at least 5 layers, alternatively at least 7 layers, alternatively at least 9 layers, alternatively at least 11 layers, alternatively from 2 to about 20 layers, alternatively from 3 to about 11 layers, and alternatively from 5 to 11 layers. The films may or may not comprise a skin layer to reduce tackiness of one or both external surfaces.

The films of the present invention have excellent physical properties, including impact strength and tensile strength. "Tensile strength," means the load required to induce a break ("load at break") in the film in either the cross-direction (CD) or the machine-direction (MD). Tensile strength is expressed in units of N/cm or equivalent units thereof, and may be determined by ASTM method D822-02, using the following parameters: Sample Direction=MD or CD; Sample size=1 inch width×6 inch length; Test speed=20 in/min; Grip distance=2 inch. Grip size=3 inch wide rubber faced grips evenly gripping sample. The films of the present invention have a CD load at break greater than 1.5 N/cm, alternatively greater than about 2.0 N/cm, alternatively greater than about 3.0 N/cm and alternatively greater than about 4.0 N/cm. The films of the present invention have an MD load at break of at least about 4.0 N/cm, alternatively at least about 8 N/cm, and alternatively at least about 10 N/cm. The films further have an MD elongation of greater than about 200%, alternatively greater than about 300%, alternatively greater than about 400%, and alternatively of from about 101% to about 150%. The films of the present invention may have a CD elongation of at least about 200%, alternatively at least about 300%, alternatively at least about 400%, alternatively at least about 800%, alternatively from about 101% to about 900%, and alternatively of from about 200% to about 600%.

The films of the present invention may have an impact strength of at least about 15 g, alternatively at least about 20 g, alternatively at least about 25 g, alternatively at least about 30 g, and alternatively from about 15 g to about 40 g, as measured by ASTM D1709.

Foamed Films

According to an alternative embodiment of the present invention, the thermoplastic polymer film may be either a monolayer or a multilayer foamed film. Extruded thermoplastic foam films are generally prepared by heating a thermoplastic material to form a plasticized or melt polymer material, incorporating therein a blowing agent to form a foamable gel, and extruding the gel through an extrusion die.

The foam may be formed by any of the aforementioned thermoplastic polymers which can be formed into an open cell foam as described herein. Physical and/or chemical blowing agents may be used to make the foamed films. Useful physical blowing agents include substances that are gases at the temperature that the foamed film is formed, which include hydrocarbons, halohydrocarbons, or other typical industrial gases or volatile liquids. The amount of physical blowing agent employed may be from about 0.06 to about 0.17 gram-moles per 100 grams of polymer. For example, the amount of physical blowing agent may be from about 0.08 to about 0.12 gram-moles per 100 grams of polymer, or from 0.09-0.10 gram-moles per 100 grams of polymer. The use of a relatively small amount of physical blowing agent allows formation of a foam with a high open cell content. Foaming temperatures can vary depending on a variety of parameters that would be understood by one of skill in the art. In one embodiment, the foaming temperature is from about 118° C. to about 160° C., and alternatively is from about 125° C. to about 135° C.

Useful chemical blowing agents include substances that generate gas at the temperature that the foamed film is formed. Exemplary chemical blowing agents include, but are not limited to, bicarbonate salts such as sodium bicarbonate or potassium bicarbonate, or azo compounds, such as azodicarbonamide. Typical amounts of the chemical blowing agents used in forming foamed film may include about 0.1 parts to about 10 parts per 100 parts of the plastic polymer materials.

To assist in extruding open-cell thermoplastic foams, it may be advantageous to employ a polymer different than the predominant polymer employed in the thermoplastic material, as described in U.S. Pat. No. 5,962,545. The multilayer foam-film composite structures of this invention can be prepared by various methods, e.g., feedblock and layer multiplication technology as taught in U.S. Pat. Nos. 3,557,265 and 5,202,074, sequential layering as taught in Dooley, J. and Tung, H., Co-extrusion, Encyclopedia of Polymer Science and Technology, John Wiley & Sons, Inc., New York (2002), or a direct feedblock process as taught in U.S. Pat. No. 3,884,606. In one embodiment the structures may be prepared by co-extrusion of at least two streams of the same or dissimilar thermoplastic materials.

Method of Making

The films of the present invention may be made by a variety of processes that would be understood by one of skill in the art, and may be cast, blown, calendered, monoextruded, co-extruded, chill cast, or any other method which would result in a film compatible with the process described herein. Once formed, the film may be further processed and embossed in accordance with one or more of the embodiments described herein.

Figure 2:
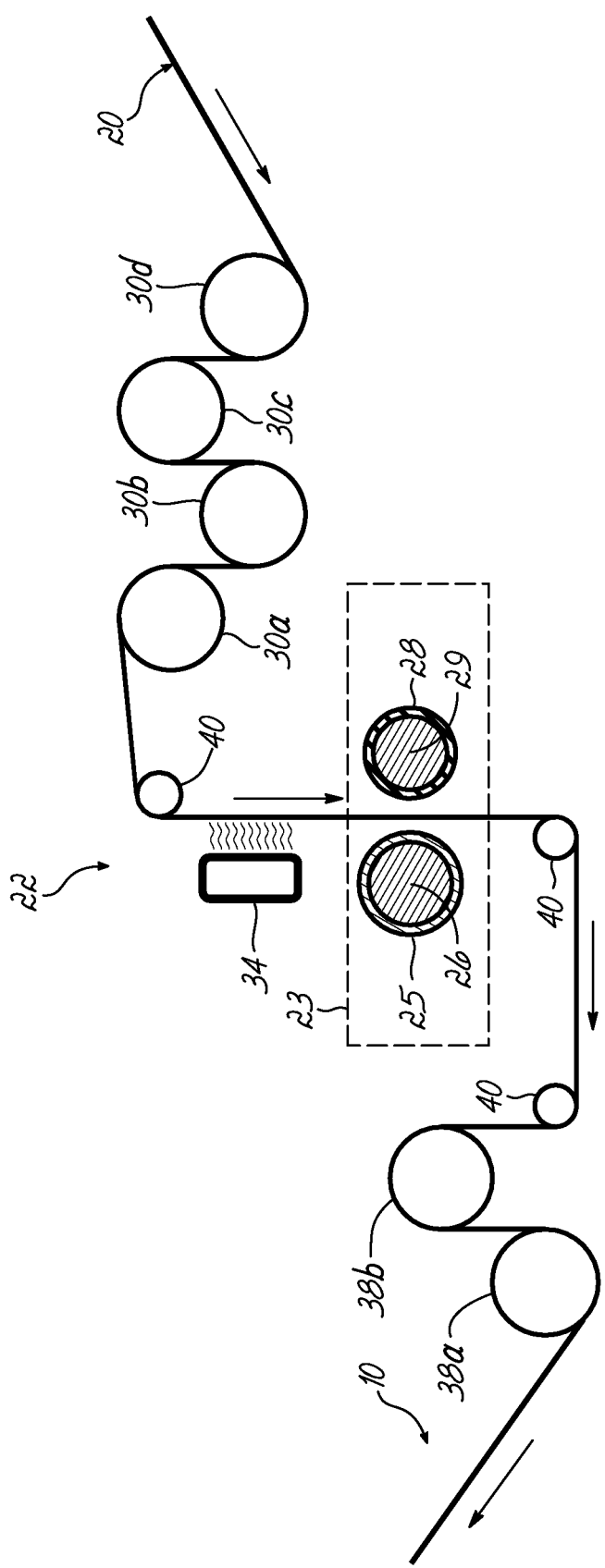
FIG. 2 depicts a schematic representation of one apparatus suitable for making the embossed thermoplastic films of the present invention.

With reference to FIG. 2, the embossed film 10 can be formed by passing a thermoplastic polymer film 20 through one or more heated rollers 30a-30d and optionally a secondary heater such as infrared heater 34. In one embodiment, the temperature of the heated rollers is from about 60° C. to about 130° C. One or more idler rolls 40 also may be employed. The film is advanced through an embossing system 22 where the film 20 is sandwiched between a combination of rolls 23, which include an embossing roll 25 and a counter roll 28, each of which as shown may have a central core 26 and 29, respectively. After advancing through the rolls 25, 28, the embossed thermoplastic polymer film 10 may be cooled by one or more cooling rolls 38a, 38b. In one embodiment, the temperature of the cooling rolls is from about 10° C. to about 30° C.

Figure 3:
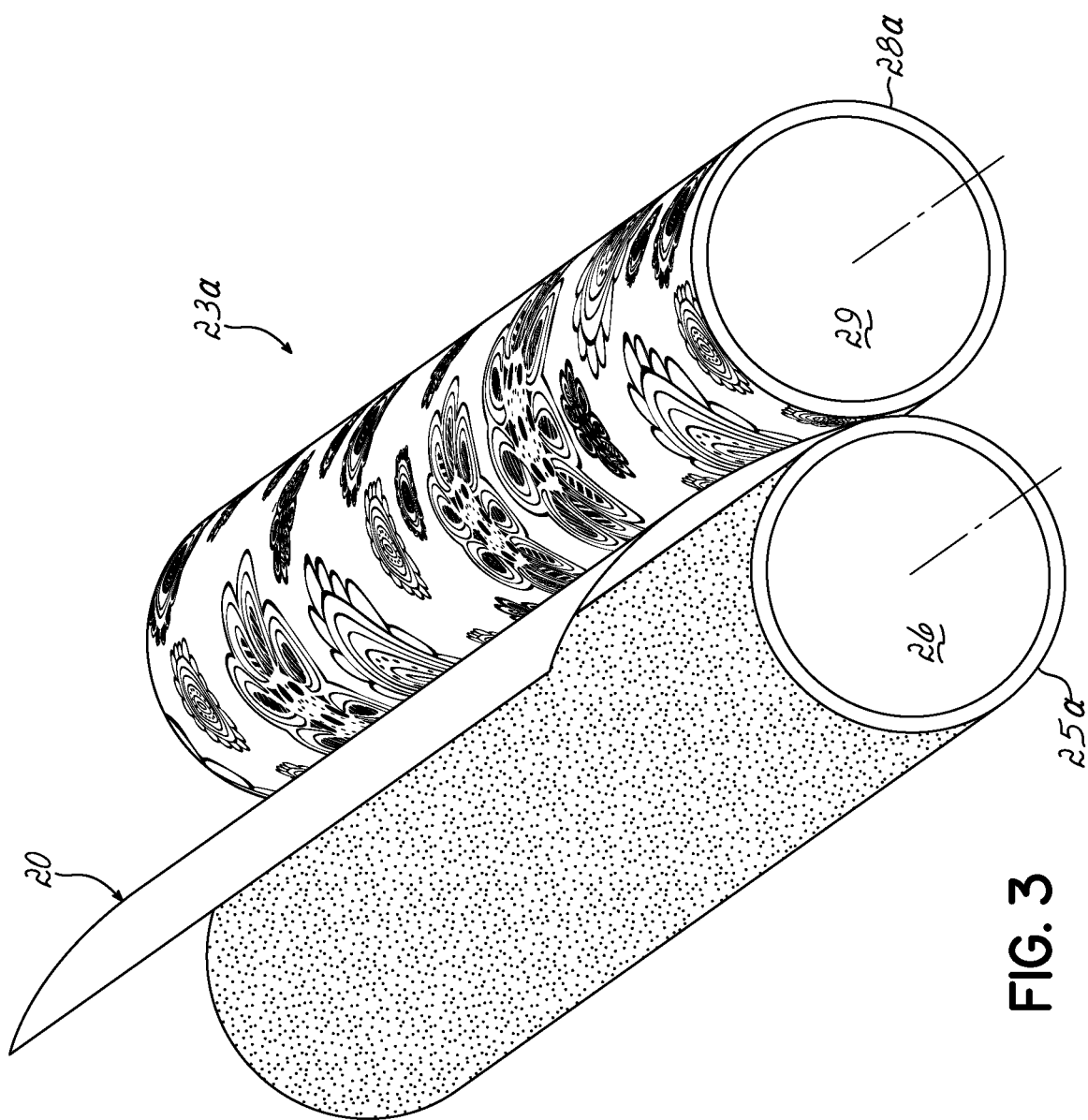
FIG. 3 depicts a schematic representation of a perspective view of a set of dual embossing rolls, in accordance with one embodiment of the present invention.

FIG. 3 depicts one embodiment (Embodiment A) of the present invention. The combination of rolls 23a includes a first embossing roll, 25a, having a micro-embossing pattern; and a second embossing roll 28a, which also serves as a counter roll, having an elastic surface and an embossing pattern engraved or etched therein that forms an embossed pattern in the embossed film 20. The micro-embossed pattern on first embossing roll 25a corresponds spatially to non-engraved regions on the second embossing roll 28a. The first embossing roll 25a, may be a traditional embossing roll made of metal, such as steel, or hard plastic. The depth and density of the engraved matte micro-embossing features (e.g., peaks, lines, etc.) in the surface of the embossing roll 25a may be varied to achieve the desired level of specular gloss reduction.

The counter roll or second embossing roll 28a in Embodiment A may have an elastic surface, wherein the visible design is engraved, one non-limiting example of which is the floral design shown in FIG. 3. As the thermoplastic film is advanced through the nip between the two embossing rolls, the film is molded into the embossed pattern. In an alternative embodiment, the first embossing roll 25a or the second embossing roll 28a may have a central core 26 resp. 29 of any suitable material, which is covered by a surface layer of an elastic material having the desired hardness. The thickness of the elastic surface of embossing roll 28a is not particularly limited, and in one embodiment is from about 30 mm to about 3 mm and may have a hardness value between 25 Shore A to 100 Shore A.

In an alternative embodiment, a sleeve system may be used with the micro-embossing roll and/or embossing roll. In one non-limiting example, the core of the roll comprises a steel mandrel over which the sleeve is pushed, for example, by using compressed air. The design is engraved, etched, etc. on the sleeve. Therefore, rather than replacing the entire roll for each pattern, various interchangeable sleeves may be used, which results in significant cost savings and increased flexibility in the manufacturing process.

Figure 4:
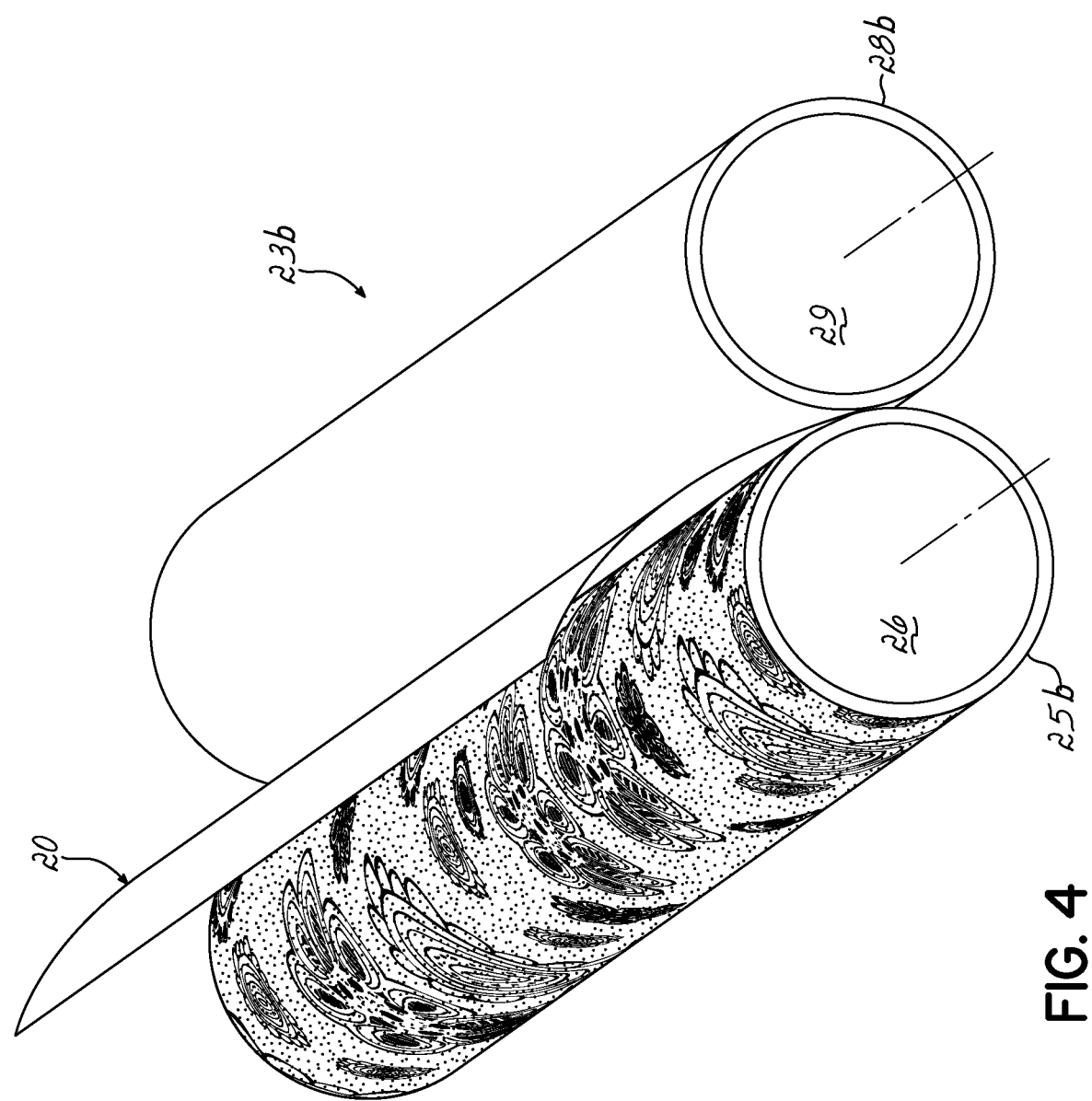
FIG. 4 depicts a schematic representation of a perspective view of an embossing roll comprising multiple embossing levels and a smooth counter roll, in accordance with one embodiment of the present invention.

FIG. 4 depicts an alternative embodiment ("Embodiment B"), wherein an embossing apparatus comprises a combination of rolls 23b, in turn comprising a complex embossing roll 25b having a multi-level embossing pattern thereon that forms an embossed pattern into embossed film 20, and a counter roll 28b having a substantially uniform outer surface. The complex embossing roll 25b comprises a plurality of micro-embossing and embossing patterns, each having an increasing embossing depth. As would be apparent to one of skill in the art, additional patterns having varying depths may be included on the roll. In an alternative embodiment, the first embossing roll 25a or the second embossing roll 28a may have a central core 26 resp. 29 of any suitable material, which is covered by a surface layer of an elastic material having the desired hardness.

In either Embodiment A (FIG. 3) or Embodiment B (FIG. 4), the embossing process may be performed at either an elevated temperature or at room temperature. The temperature refers to the temperature of the film just prior to embossing, and may be measured, for example, by means of an IR probe. In one embodiment, the temperature of the film is from about 10° C. to about 50° C., alternatively is from about 25° C. to about 28° C., alternatively is from about 45° C. to about 150° C., and alternatively is from about 130° C. to about 135° C. In one embodiment, the embossing process is performed at a pressure of about 90 bar.

Figure 5:
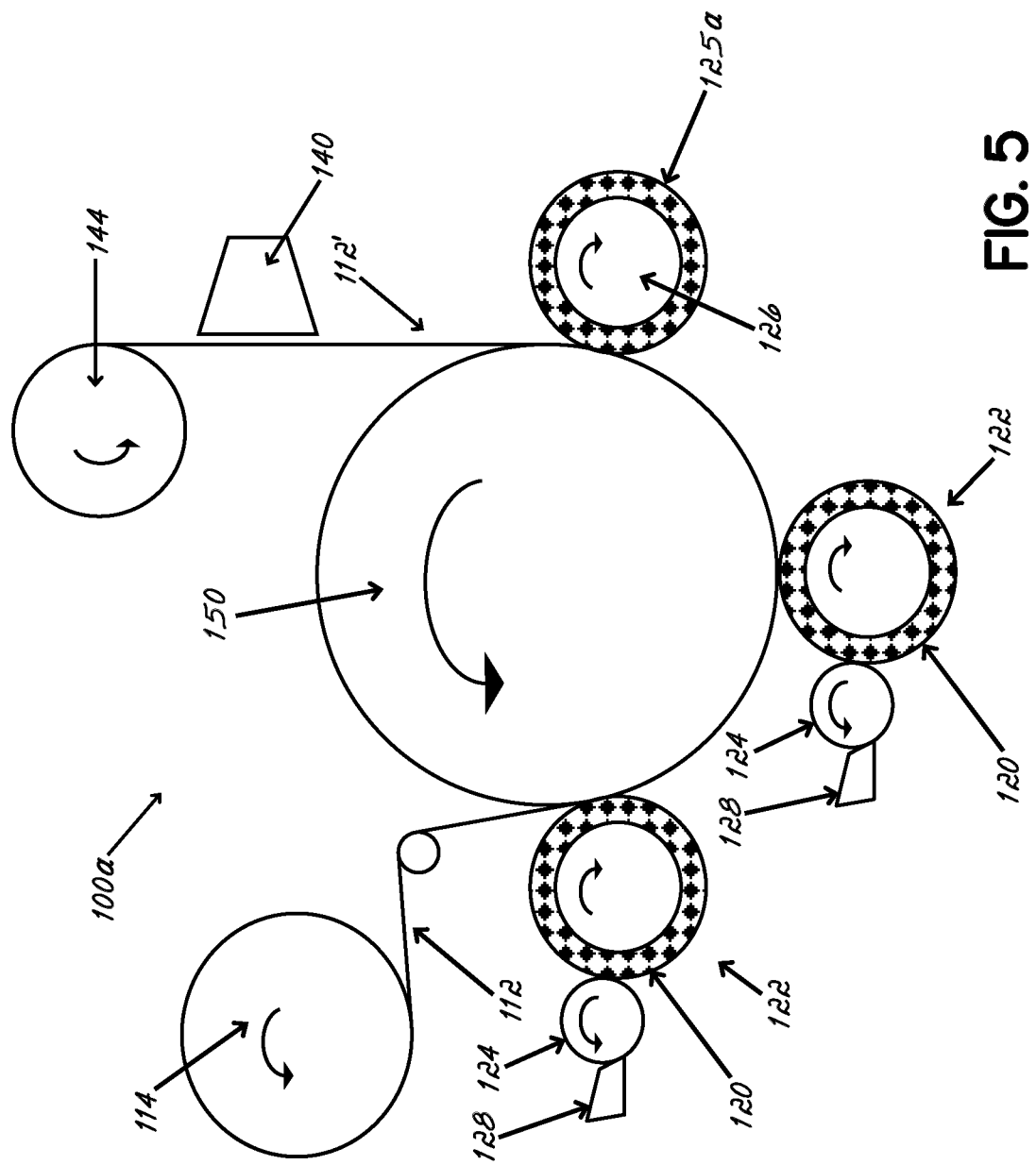
FIG. 5 depicts a schematic representation of one example of an embossing and printing apparatus suitable for making a printed and embossed thermoplastic film of the present invention.
Figure 6:
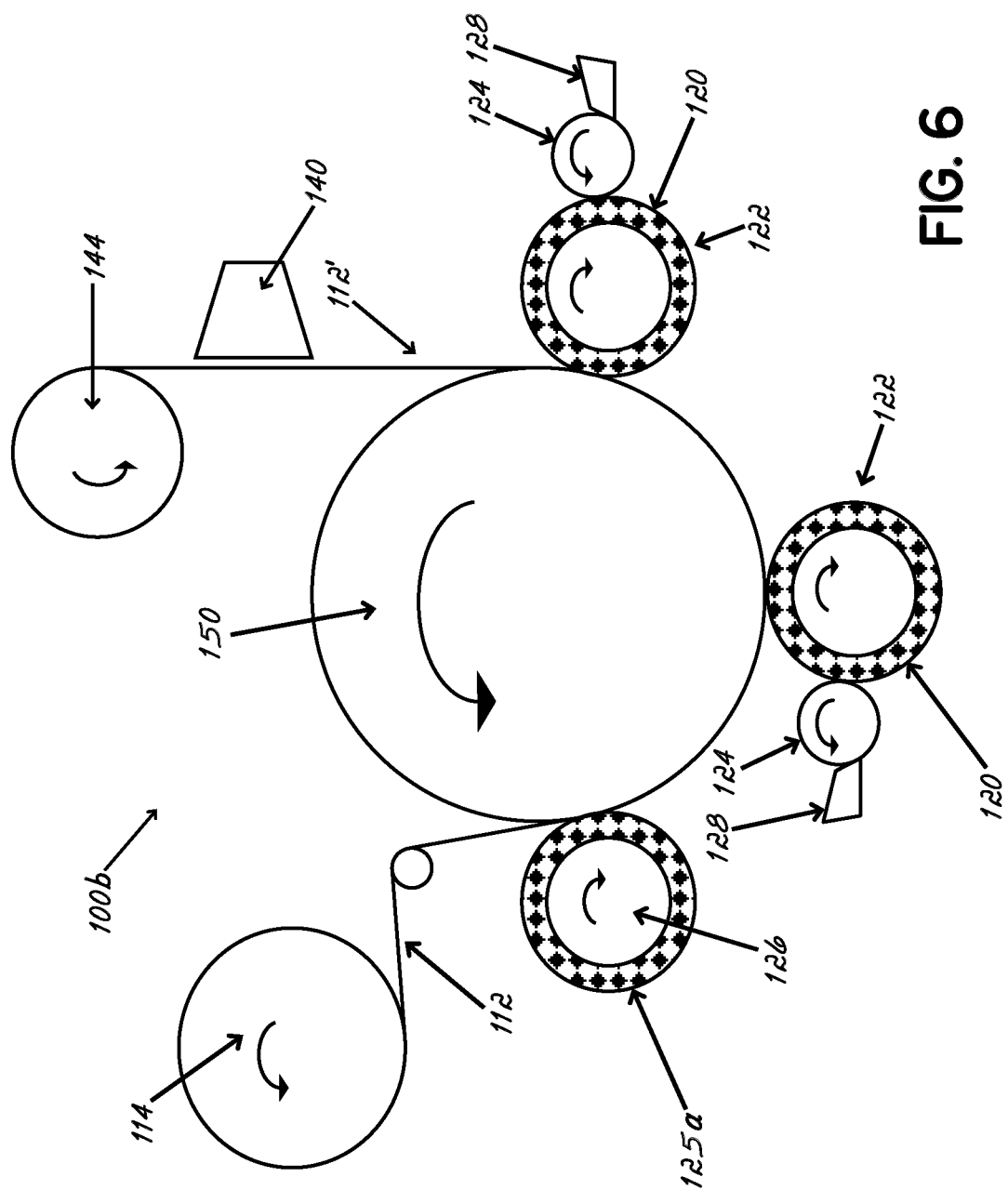
FIG. 6 depicts a schematic representation of an alternative embodiment of an embossing and printing apparatus suitable for making a printed and embossed thermoplastic film of the present invention.

Embodiment B is particularly amenable to a flexographic printing process. Referring to FIGS. 5 and 6, an integrated embossing and flexographic printing system 100a is depicted which comprises a central impression (CI) drum 150. A film 112 is advanced by means of roll 114 and may be guided by idler rolls to CI drum 150. CI drum 150 advances the film along one or more printing decks. Each printing deck comprises a pan 128, from which the ink is transferred by an anilox roll 124 to one of a plurality of impression plates 120, which are mounted on rolls 122. Additional printing decks may be incorporated to apply inks having a different color, a varnish, or other compositions that would be known to one of skill in the art. After printing, the film may be embossed. Integrated embossing and flexographic printing system 100a further may comprise an embossing roll or complex embossing roll, 125a, on a central core 126. After embossing, the printed and embossed film 112 optionally may be treated by a drying unit 140 to hasten the drying of the printed ink, then optionally wound by winding roll 144.

Although not shown, the drying unit may be repositioned between the printing and embossing rolls to facilitate drying of the ink prior to embossing. Alternatively, FIG. 6 depicts flexographic printing system 100b, wherein the film 112 may be embossed prior to printing. In all embodiments, the printing may be in register with the embossing.

Alternatively, the thermoplastic polymer films may be dispensed directly onto a substrate material to form a composite (laminate) material. The films and/or laminates may be stored at room temperature for a reasonable period of time, for example at least one month, without exhibiting significant loss of definition of the embossed patterns, understood to mean a decrease of the original embossing depth of more than about 20%.

In yet another alternative embodiment, the films of the present invention may be made by embossing during the extrusion process. In contrast to micro-embossing and embossing a previously formed and optionally printed thermoplastic film, a molten film web may be cast directly between two embossing rolls, alternatively between an embossing roll and a counter roll, or alternatively onto an embossing roll not paired with a counter roll, and thus embossed prior to printing. Thus, the molten web is brought on an engraved roll, for example, as shown in FIG. 3 or 4. Because the polymeric composition is still molten, it fills in the design patterns and thus results in the visually appealing combination of micro-embossing and/or embossing.

Articles of Manufacture

The thermoplastic films described herein are useful for a number of purposes, one example of which is as protective wrapping or packaging for virtually any commercial product, including consumer goods. Examples of consumer products include electronic products, automotive products, car care products, fabric and home care products, oral care products, laundry products, clothing, jewelry, and personal care products, including beauty care and skin care products.

One class of consumer products for which the films of the present invention are suitable are disposable absorbent articles, including but not limited to disposable diapers, training pants, incontinence pads and pants, sanitary napkins, tampons, pantiliners, wipes, wet wipes, bandages and pessaries. The thermoplastic films of the present invention are particularly suitable for individual wrapping of disposable personal care products, such as pouches and sealed wrappers. The thermoplastic films of the present invention further may be laminated to a woven or non-woven sheet or film, and be used, for example, as an outer cover for a diaper or a backsheet for a feminine care pad or adult incontinence product.

The thermoplastic films of the present invention further may be useful for packaging materials that can be formed into stable three-dimensional forms that provide a pleasing visual and tactile impression to a purchaser and/or user. The films of the present invention may be used as an overlayment to relatively stiff packaging materials such as paper, paperboard, cardboard, and laminates of paper or cardboard.

EXAMPLES

A multi-layered film having a thickness of about 15 microns was prepared by blown film coextrusion having the composition described in Table 1. It is to be understood that the film described here is but one example of films that are embossed. Embossed mono- and multilayer films made by cast extrusion also are suitable for embossing as described herein, provided the resulting films possess the thickness and other physical properties described herein.

TABLE 1

Composition of film.

| Compound | Extruder A | Extruder B | Extruder C |
|---|---|---|---|
| LLDPE | 50-85% | 50-85% | 50-85% |
| Polypropylene | 2.5-25% | 2.5-25% | 2.5-25% |
| White Masterbatch (e.g. REMAFIN Weiss AEX 0116) | 1-7.5% | 1-7.5% | 1-7.5% |
| Processing Aid (e.g. POLYBATCH AMF 705) | 0.25-3% | 0.25-3% | 0.25-3% |
| Stabilizer (e.g. POLYBATCH AO 25 S) | 0.25-2.5% | 0.25-2.5% | 0.25-2.5% |
| Initial Thickness of Layer | 4 microns | 7 microns | 4 microns |
| Avg. Resin Density (g/cm$^3$) | 0.947 | 0.969 | 0.947 |
| Basis weight of final film | | 10-18 gsm | |
| Tensile strength | MD: >11.0 N/cm; CD: >4.4 N/cm | | |
| Elongation | MD: >345%; CD: >890% | | |

The multi-layered film was printed using rotogravure printing on a Cerutti Line with a solid silver-colored ink applied with a photogravure printer at 1.5 bar pressure, followed by drying at 40° C. It is to be understood that if the films are printed with ink, any color of suitable glossy ink may be used.

Embodiment A

The printed film was embossed using 1) a embossing roller having a matte pattern comprising about 114 lines/inch, and 2) a custom-designed rubber roller comprising a multi-level design pattern having flowers, dots, etc. engraved to depths of about 50 microns and about 200 microns. The custom-designed rubber roll included a 3 mm thick rubber surface having a Shore A hardness value of either 70 or 90. Embossing the printed film was performed at about 135° C. under 90 bar embossing pressure to provide a printed, embossed thermoplastic film. Other design and matte background samples were also prepared under similar conditions.

Embodiment B

The printed film was embossed using a roll supplied by Saueressig, Vreden, Germany, having a matte pattern and custom-designed floral design (and other features such as rain drops, small dots, larger dot, etc.) pattern engraved to a depth of about 150 µm, and the counter roll included a 3 mm thick rubber surface having a Shore A hardness value of 90. Embossing the printed film was performed at about 135° C. under 90 bar embossing pressure to provide a printed, embossed thermoplastic film. Other design and matte background samples were also prepared under similar conditions.

Figure 7B:
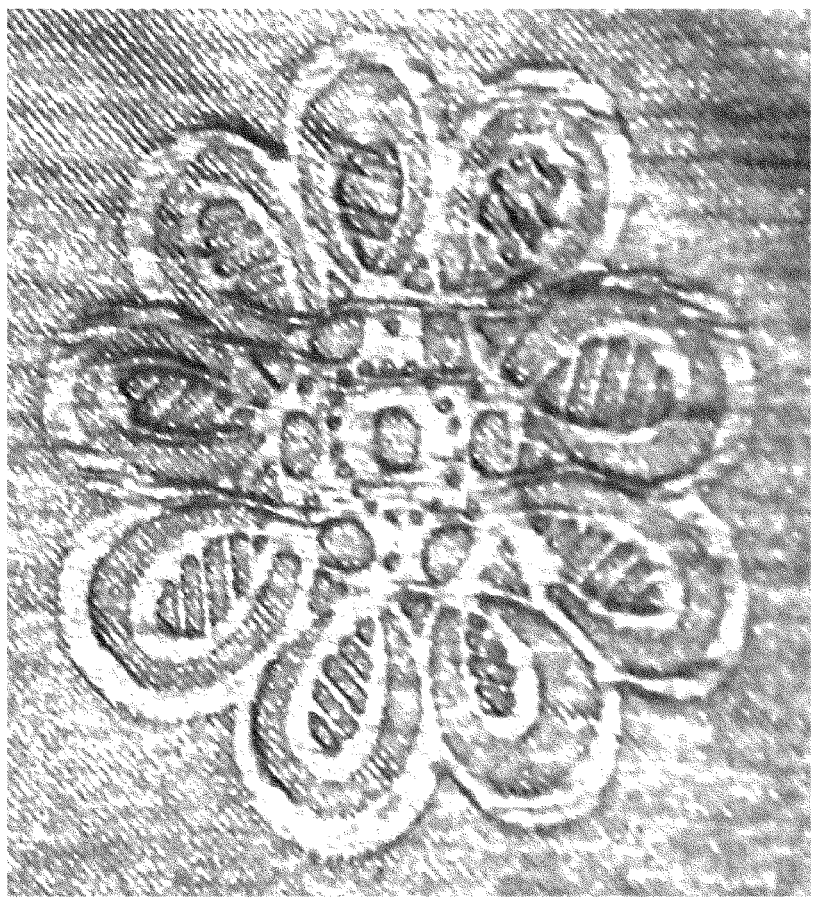
FIG. 7B represents a magnified photographic view of an embossed film comprising areas of matte and glossy finish, showing the surface of the film that was produced by utilizing a rubber embossing roll, as depicted in FIG. 3.
Figure 7A:
FIG. 7A represents a magnified photographic view of an embossed film comprising areas of matte and glossy finish, showing the surface of the film that was produced by utilizing a metallic or plastic embossing roll, as depicted in FIG. 3.

FIG. 7A shows a magnified photographic view of a film having a matte background, and embossed with a flower design that is accentuated by regions of matte and glossy finish, from a top (metal/plastic embossing roll side) of the film, prepared by the embossing apparatus depicted in FIG. 3. FIG. 7B shows a magnified photographic view of a film having a matte background, and embossed with a flower design accentuated by regions of matte and glossy finishes, from a bottom (rubber embossing roll side) of the film, prepared by the embossing apparatus embodiment depicted in FIG. 3.

Exemplary specular gloss measurements of the printed, embossed film were taken on a sample prepared in accordance with Embodiment B (see Table 3).

TABLE 2

Specular gloss measurements of portions of printed, embossed film samples measured in Gloss Units and prepared in accordance with Embodiment B.

Figure 8A:
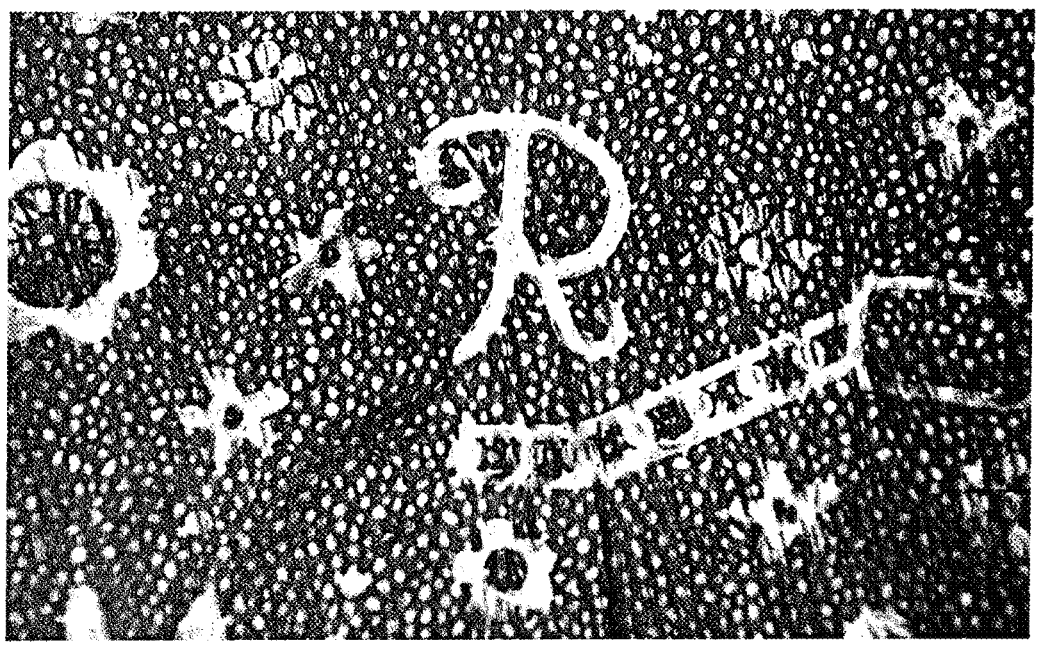
FIG. 8A shows a photographic view of a film having a matte finish and an embossed design comprising glossy flowers. The film was produced by contacting a micro-embossed film with a smooth counter roll and an embossing roll engraved with a decorative flower design.

| Sample | Printed silver film w/o embossing | Rain Drops | Bkgd Flowers | Small Dots (e.g, FIG. 7A, inner concentric circle) | Small Dots (e.g, FIG. 7A, inner concentric circle) | Bkgd Flowers (FIG. 1(19); FIG. 8A | Bkgd Rain Drops | Glossy Bkgd Flowers (FIG. 1 (19); FIG. 8A bkgd) | MICRO-FLEX embossed Film (FIG. 1 (16)) |
|---|---|---|---|---|---|---|---|---|---|
| | 48.2 | 14.5 | 17.0 | 24.8 | 14.1 | 16.3 | 19.5 | 37.7 | 30.6 |
| | 47.9 | 12.6 | 16.3 | 24.0 | 14.6 | 12.0 | 20.2 | 37.4 | 31.1 |
| | 49.1 | 13.6 | 17.0 | 24.2 | 14.0 | 14.6 | 18.8 | 38.2 | 33.6 |
| | 48.8 | 14.5 | 18.9 | 24.6 | 13.1 | 15.8 | 17.0 | 40.5 | 33.1 |
| | 44.1 | 12.5 | 17.2 | 24.4 | 13.6 | 15.8 | 19.3 | 36.7 | 29.8 |
| | 45.8 | 12.4 | 17.8 | 24.5 | 14.7 | 14.8 | 19.0 | 37.6 | 33.7 |
| | 47.0 | 16.5 | 18.6 | 24.2 | 14.6 | 12.4 | 20.2 | 36.7 | 27.9 |
| | 49.9 | 16.2 | 18.6 | 24.8 | 14.1 | 14.1 | 19.0 | 35.0 | 31.6 |
| | 48.4 | 12.2 | 17.5 | 25.0 | 14.9 | 13.3 | 20.4 | 36.8 | 30.9 |
| AVG | 47.7 | 13.7 | 17.6 | 24.5 | 14.2 | 14.4 | 19.1 | 37.6 | 31.9 |
| Std. Dev. | 1.71 | 1.64 | 0.84 | 0.34 | 0.55 | 1.46 | 1.14 | 1.52 | 2.48 |
| $G_f/G_i$ | | 0.28 | 0.370 | 0.515 | 0.298 | 0.401 | 0.303 | 0.789 | 0.670 |

The impact strength of similar, representative samples is measured according to ASTM D1709-09 and found to have an average dart drop value of 22 g.

FIG. 8A shows a photographic view of a film having a matte finish and an embossed design comprising glossy flowers. The film was produced by contacting a micro-embossed film with a smooth counter roll and an embossing roll engraved with a decorative flower design.

Figure 8B:
FIG. 8B shows a magnified photographic view of a film having an embossed design comprising random lines resembling leather ("leather look").

FIG. 8B shows a magnified photographic view of a film having an embossed design comprising random lines resembling leather ("leather look").

Figure 9B:
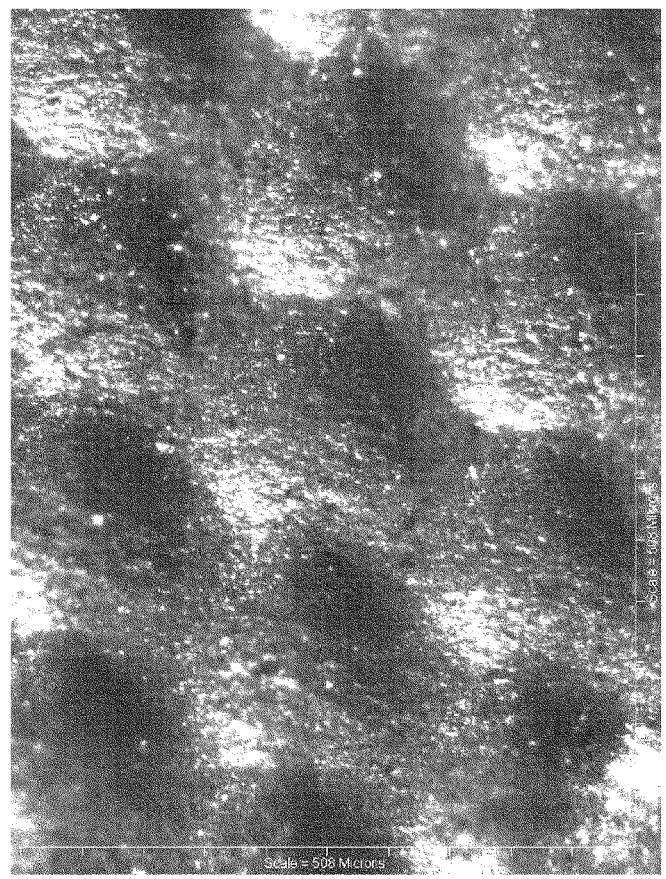
FIG. 9B represents a further magnified photographic view of a portion of an embossed film, having a reference scale of 508 microns.
Figure 9A:
FIG. 9A represents a magnified photographic view of a portion of an embossed film, having a reference scale of 899 microns, showing micro-embossing and embossing.

FIGS. 9A-9B show magnified photographic views of a portion of an embossed film having a matte background and portions of micro-embossed and embossed areas. Scales of 899 microns and 508 microns, corresponding to FIGS. 9A-9B, respectively, are shown for reference.

Figure 10B:
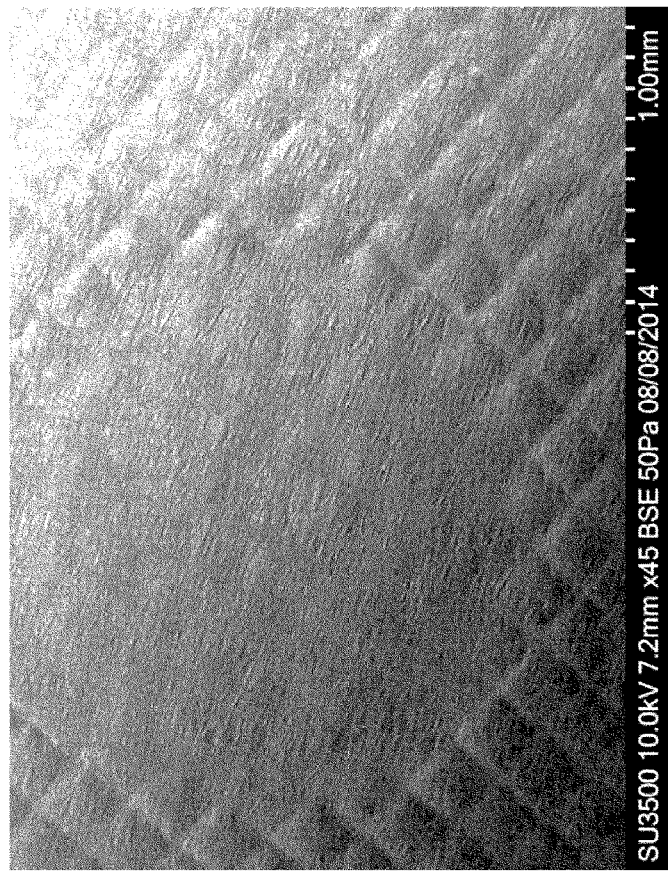
FIGS. 10A and 10B depict scanning electron microscope (SEM) images of secondary electron (FIG. 10A) and backscatter (FIG. 10B) micrographs of an embossed film, showing the surface of the film that was produced by utilizing a metallic or plastic embossing roll, as depicted in FIG. 3.
Figure 10A:
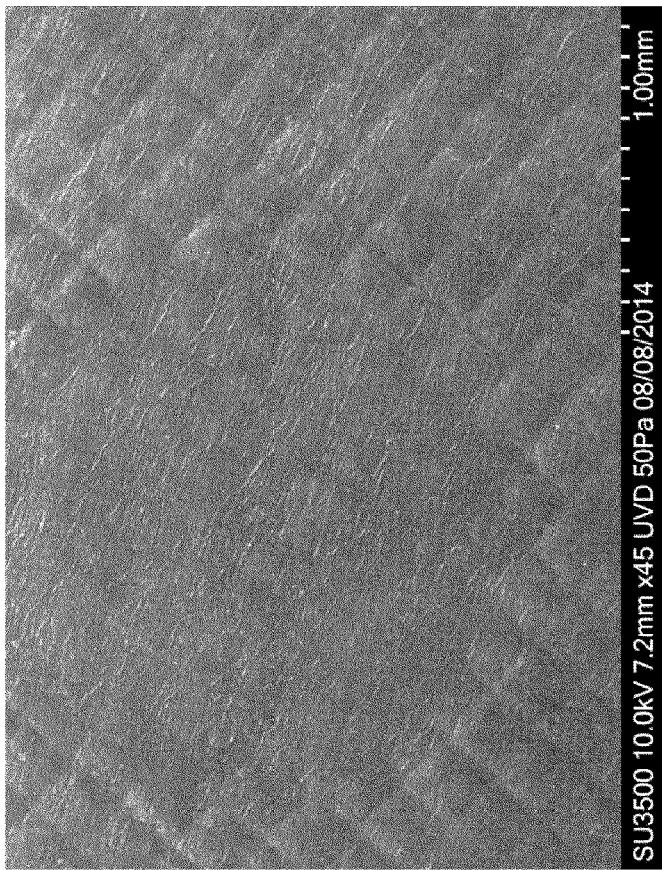

FIGS. 10A and 10B show Scanning Electron Microscope (SEM) images showing secondary electron (10A) and backscatter (10B) micrographs of an embossed film having a matte background, from the surface of the film that was in contact with the metal/plastic embossing roll, which was prepared using an embossing apparatus depicted in FIG. 3.

Figure 11B:
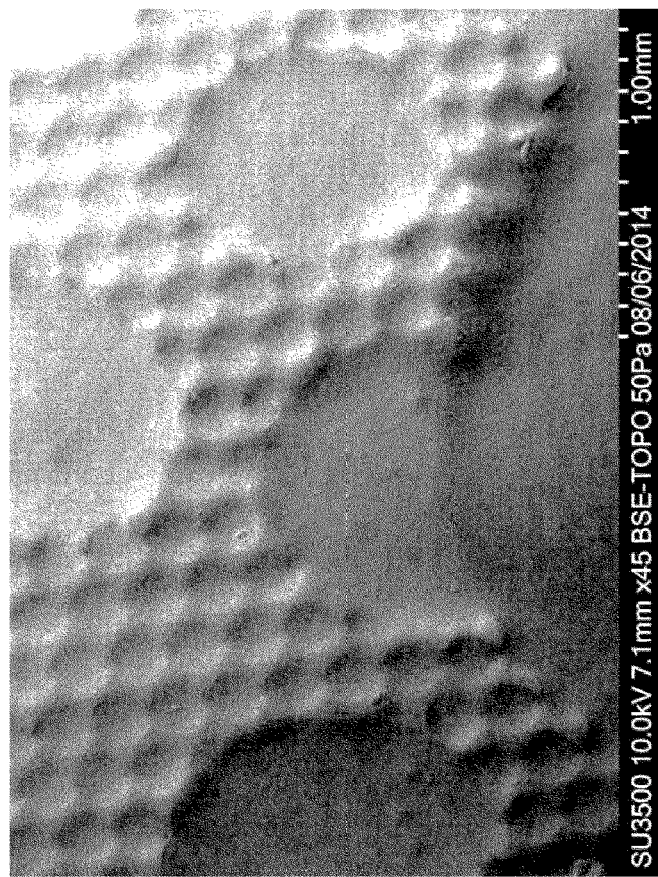
FIGS. 11A and 11B depict scanning electron microscope (SEM) images of secondary electron (FIG. 11A) and backscatter (FIG. 11B) micrographs of an embossed matte film, showing the surface of the film that was produced by utilizing a metallic or plastic embossing roll, as depicted in FIG. 4.
Figure 11A:
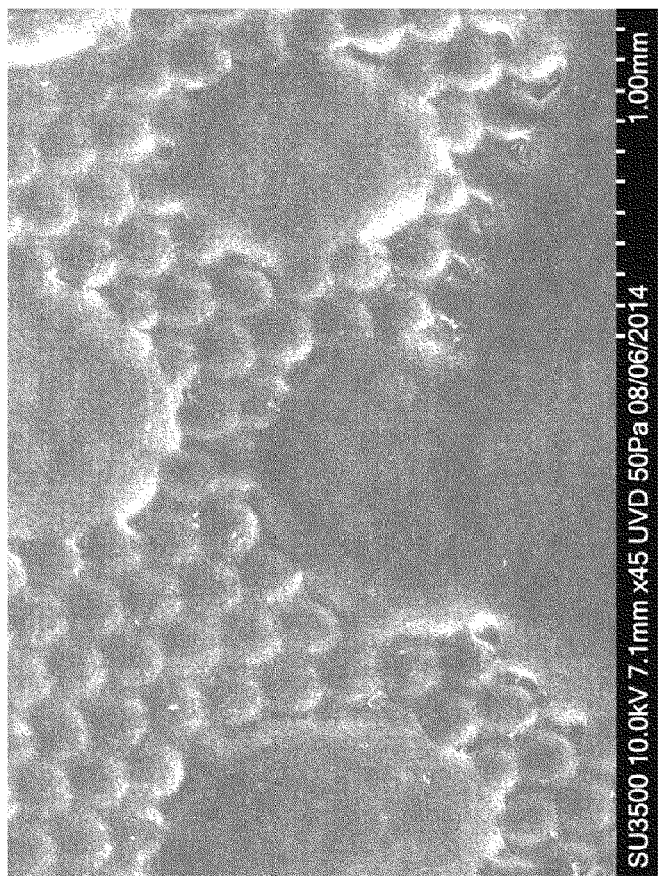

FIGS. 11A and 11B are SEM images showing secondary electron (11A) and backscatter (11B) micrographs of an embossed film having a matte background, from the surface of the film that was in contact with the metal/plastic embossing roll, which was prepared using an embossing apparatus depicted in FIG. 4. The SEM micrographs were taken on a Hitachi SU3500 operated at 10.0 kV, 45× magnification, with variable pressure setting at 50 Pa. Embossing depths were measured using Tegatron CMD-IV Microscope (Tegatron, Inc., Franklin, Ohio).

TABLE 3

Depth measurements of the embossing patterns present on the surface of the embossed side of the film shown in FIGS. 11A-11B, run at 130-135° C.:

|  |  |  |  |  | Average | Std. Dev. |
|---|---|---|---|---|---|---|
| Micro (μm) | 37 | 39 | 34 | 37 | 3 |
| Droplet (μm) (First embossing pattern) | 135 | 115 | 95 | 115 | 20 |
| Flower (μm) Second embossing pattern | 146 | 171 | 131 | 149 | 20 |

TABLE 4

Depth measurements of the embossing patterns present on the surface of the opposite side of the film shown in FIGS. 11A-11B, in which the film was made at a temperature of from about 130° C.-135° C.:

|  |  |  |  |  | Average | Std. Dev. |
|---|---|---|---|---|---|---|
| Micro (μm) | 48 | 48 | 40 | 45 | 5 |
| Flower (μm) (Second embossing pattern) | 149 | 138 | 135 | 141 | 7 |

TABLE 5

Depth measurements of the embossing patterns present on the surface of the embossed side of a film made with embossing apparatus depicted in FIG. 4, in which the film was made at a temperature of about 25° C.-28° C.:

|  |  |  |  |  | Average | Std. Dev. |
|---|---|---|---|---|---|---|
| Micro (μm) | 26 | 34 | 36 | 32 | 5 |

TABLE 6

Depth and gloss measurements of the embossing patterns present on the surface of the matte side of a silver-colored film embossed with a random line pattern ("leather look"), in which the film has a temperature of about 25° C.-28° C.:

|  |  |  |  |  |  | Average | Std. Dev. |
|---|---|---|---|---|---|---|---|
| Micro (μm) | 91 | 84 | 93 | 99 | 89 | 93.2 | 3.4 |
| Gloss (Gloss Units) | 19.4 | 19.6 | 21.0 | 19.2 | 20.3 | 19.9 | 0.67 |

In all embodiments of the present invention, all percentages are by weight of the total composition, unless specifically stated otherwise. All ranges are inclusive and combinable. All numerical amounts are understood to be modified by the word "about" unless otherwise specifically indicated. To the extent that the terms "includes," "including," "contains," or "containing" are used in the specification or the claims, they are intended to be inclusive in a manner similar to the term "comprising" as that term is interpreted when employed as a transitional word in a claim.

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

Whereas particular embodiments of the present invention have been illustrated and described, it would be obvious to those skilled in the art that various other changes and modifications can be made without departing from the spirit and scope of the invention. It is therefore intended to cover in the present claims all such changes and modifications that are within the scope of this invention.

We claim:

1. A thermoplastic polymeric film comprising at least one thermoplastic polymer, wherein:
   a. at least one portion of said film is micro-embossed with a micro-embossing pattern;
   b. at least one portion of the film is embossed with a first embossing pattern having a first embossing depth which is greater than the micro-embossing depth; and,
   c. wherein the film has a basis weight of about 18 gsm or less and an impact strength of about 15 g to 40 g,
   wherein the micro-embossing pattern of the design comprises lines having a density of at least about 75 lines/inch.

2. The film of claim 1, wherein the micro-embossed portion of the film has a ratio of Gf/Gi of less than about 0.7 or a specular gloss of less than about 35 gloss units.

3. The film of claim 1, wherein the micro-embossing pattern has a micro-embossing depth of about 80 μm or less.

4. The film of claim 1, wherein the embossed portion of the film has a ratio of Gf/Gi that is greater than about 0.7 or a specular gloss of greater than about 35 gloss units.

5. The film of claim 1, wherein the embossed portion of the film has a ratio of Gf/Gi of less than about 0.7 or a specular gloss of less than about 35 gloss units.

6. The film of claim 1, wherein the film comprises at least one colorant.

7. The film of claim 6, wherein the colorant is printed onto at least one side of the film.

8. The film of claim 7, wherein at least one colorant forms a printed design.

9. The film of claim 8, wherein the printed design is in register with the embossed pattern.

10. The film of claim 6, wherein the colorant is dispersed throughout the film.

11. The film of claim 1, wherein the thermoplastic polymer comprises a polyolefinic polymer, a polyolefinic copolymer, an olefinic block copolymer, or combinations thereof.

12. The polymeric film of claim 1, wherein at least one portion of the film is embossed with a second embossing pattern having a second embossing depth which is greater than the first embossing depth.

13. The polymeric film of claim 1, wherein the film is laminated to a substrate.

14. A thermoplastic polymeric film comprising at least one thermoplastic polymer, wherein:

a. at least one portion of said film is micro-embossed with a micro-embossing pattern having a micro-embossing depth and a line density of at least about 125 lines/inch;
b. at least one portion of the film is embossed with a first embossing pattern having a first embossing depth which is greater than the micro-embossing depth; and,
c. at least one portion of the film is embossed with a second embossing pattern having a second embossing depth which is greater than the first embossing depth;
d. the micro-embossed portion of the film has a ratio of Gf/Gi of less than about 0.7 or a specular gloss of less than about 35 gloss units;
e. the portion of the film embossed with the second embossing pattern has a ratio of Gf/Gi that is greater than about 0.7 or a specular gloss of greater than about 35 gloss units; and,
f. the film has a basis weight of about 18 gsm or less and an impact strength of about 15 g to 40 g.

* * * * *